UNITED STATES PATENT OFFICE

MASAYASU MIYAHARA, OF KOBE, JAPAN

MERCURIC CYANIDE TARTRATE AND THE PROCESS OF MAKING IT

No Drawing. Application filed June 4, 1928, Serial No. 282,891, and in Japan March 9, 1928.

This invention relates to a process of preparing a new chemical compound of tartaric acid with mercuric oxycyanide which possesses a great germicidal property.

To the best of the inventor's knowledge and belief, a compound of tartaric acid with mercuric oxycyanide has never been disclosed in prior literatures, although several compounds of mercuric oxycyanide with other organic acids are known.

The inventor has succeeded in obtaining a compound which has a very strong germicidal power with almost no irritating property on human membrane and which therefore can be used for curative and prophylactic purposes.

According to this invention, one molecular weight or 150 grammes of tartaric acid and one molecular weight or 470 grammes of mercuric oxycyanide are dissolved in a quantity of alcohol, say 2.5 litres, in which the above quantities are just dissolved, and the solution is heated on a hot water bath in order to have chemical reaction completed. This solution is filtered, if necessary, and evaporated at a low temperature in order to recover alcohol. The mother liquid is next gently cooled, then pretty white needlelike crystals are obtained, which are purified by washing with acetone.

The elemental analysis of the substance has proved that it is a new compound to be named mercuric cyanide tartrate which may be expressed by the following equation,

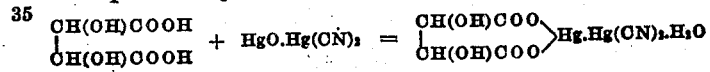

By the combination of two molecular weight of tartaric acid with one molecular weight of mercuric oxycyanide, an acid salt is obtained.

The compound dissolves readily in water, but the solution produces, in course of time, a precipitation of crystals of mercuric tartrate by hydrolysis, so that its germicidal power reduces considerably.

This fact led the inventor to investigate a method to prevent hydrolysis and also to make the compound stable enough for preservation. The inventor has succeeded in attaining a satisfactory result, by adding thereto a harmless salt or salts of tartaric acid, e. g. tartrate of sodium, of aluminium, of boro aluminium, of potassium or the like, as shown in the following examples. If these salts are added to the compound, not only the hydrolysis of the latter is prevented, but also the solvent, alcohol, can be replaced by water.

Among the merits of this improved process, the following are remarkable, (a) Elimination of alcohol as solvent.

(b) Easy dissolution of mercuric oxycyanide.

(c) A great promotion in crystallizing produced compound in comparison with the case where alcohol is used as the solvent.

*Example 1.*—180 grammes of tartaric acid is dissolved in 1.5 litres of hot water, to which 20 grammes of sodium carbonate and 470 grammes of mercuric oxycyanide is added and well stirred. The quantity of tartaric acid equivalent to the total quantity of added sodium carbonate is neutralized and sodium tartrate is produced, while mercuric oxycyanide is dissolved in the solution. The solution is filtered, if necessary, and gently heated on a hot water bath or under a reduced pressure for evaporation. White needlelike crystals of bisalt of mercuric cyanide tartrate and sodium tartrate are obtained.

*Example 2.*—120 parts of tartaric acid are dissolved in proper quantity of water, to which is added 20 parts of aluminium borate which is chemically equivalent to 20 parts of the added tartaric acid, when aluminium boro tartrate is produced. Now 310 parts of mercuric oxycyanide, which chemically equivalent to the remaining 100 parts of tartaric acid, is further added to the solution and heated at a low temperature on a hot water bath. When it is evaporated, a mixture of crystals of aluminium boro tartrate and of mercuric cyanide tartrate is obtained.

*Example 3.*—By the similar steps as above, but, in place of the aluminium boro tartrate, other harmless salts of tartaric acid such as aluminium tartrate, sodium or potassium boro tartrate, etc. is used.

*Example 4.*—By the similar steps as above, but, in place of the aluminium boro tartrate and of mercuric oxycyanide, a mercuric oxycyanide having formula of $HgO.3Hg(CN)_2$ is used.

The presence of the harmless salt or salts of tartaric acid with mercuric cyanide tartrate not only makes the new compound chemically stable but also retards the hydrolysis. Specially when aluminium boro tartrate or aluminium tartrate is added, due to the astringency of the salts, it gives a good result on the human body as an antiseptic.

Actually, the compound is never used in the chemically pure state. Although its germicidal power is so remarkably strong, that the gonococcus is killed within 5 minutes in a solution of 400,000 times the strength, but at the same time it may be said to be somewhat toxic. In order to moderate the effect and the intoxicating property of the compound, the quantity of harmless salts of tartaric acid to be added should be increased, and if required some easily soluble vehicles may be mixed.

The "Lámi" registered in the Japanese Government, is a compound prepared by the above mentioned Examples 1, 2 and 3, in which a very small quantity of mercuric oxycyanide is contained, say 1/8457 of the compound.

The results of animal tests with the Lámi, in an intraperitoneal injection of its water solution for rabbits, shows it to be harmless up to 0.8 gramme of the compound per kilogramme of its weight once every day.

By usual dosage it is also never harmful to human body.

The following is the effect on germ during the most strict microbiological tests with Lámi:—

(A) Gonococcus in a solution of 1,700 times.

(B) Weicheselbaum's meningococcus (germ of the meningitis cerebrospinalis epidemica), influenza bacillus or diphtheria bacillus in a solution of 1,000 times.

(C) Ducrey's streptobacillus (germ of soft chancre) in a solution of 700 times.

The above respective strength killed the germs within 5 minutes, respectively.

(D) Treponema pallidum (germ of syphilis) stopped instantly their active movement in a solution of 120 times the strength.

According to the clinical experiences of not only the inventor but also of ninety-six other doctors, the solution of the Lámi is very efficient as an inhalation or gargle for the throat and nose inflammation due to influenza. For the treatment of gonorrhoea and soft chancre it is very effective, too.

I claim:

1. As a new product, a compound which is mercuric oxycyanide combined with a tartaric acid.

2. As a new product, a compound which is mercuric cyanide combined with a tartaric acid, and having the formula $$HgO.3Hg(CN)_2.$$

3. A process of preparing a new compound which comprises dissolving tartaric acid in water, adding thereto carbonate of alkalimetal, further adding thereto mercuric oxycyanide, and evaporating the solution.

4. A process of preparing a new compound which comprises dissolving tartaric acid in water, adding thereto a mercuric oxycyanide with the formula of $HgO.3Hg(CN)_2$ and evaporating the solution.

In testimony whereof I have signed my name to this specification.

MASAYASU MIYAHARA.